US012349246B2

(12) United States Patent
Slivka

(10) Patent No.: US 12,349,246 B2
(45) Date of Patent: Jul. 1, 2025

(54) SYSTEM AND METHOD FOR GENERATING A CUSTOM DIMMING CURVE

(71) Applicant: Crestron Electronics, Inc., Rockleigh, NJ (US)

(72) Inventor: Benjamin M. Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 159 days.

(21) Appl. No.: 18/137,683

(22) Filed: Apr. 21, 2023

(65) Prior Publication Data

US 2023/0345596 A1 Oct. 26, 2023

Related U.S. Application Data

(60) Provisional application No. 63/333,267, filed on Apr. 21, 2022.

(51) Int. Cl.

| | |
|---|---|
| ***H05B 45/10*** | (2020.01) |
| ***H05B 47/11*** | (2020.01) |
| ***H05B 47/125*** | (2020.01) |
| ***H05B 47/19*** | (2020.01) |

(52) U.S. Cl.
CPC ............. *H05B 45/10* (2020.01); *H05B 47/11* (2020.01); *H05B 47/125* (2020.01); *H05B 47/19* (2020.01)

(58) Field of Classification Search
CPC ...... H05B 45/10; H05B 47/11; H05B 47/125; H05B 47/19; H05B 47/196; H05B 47/1965
See application file for complete search history.

(56) References Cited

U.S. PATENT DOCUMENTS

| | | | |
|---|---|---|---|
| 7,072,083 | B2 | 7/2006 | Sato et al. |
| 7,520,634 | B2 | 4/2009 | Ducharme et al. |
| 8,779,667 | B2 | 7/2014 | Nanahara et al. |
| 9,414,464 | B2 | 8/2016 | Hidaka et al. |
| 9,433,063 | B2 | 8/2016 | Bao et al. |
| 9,544,977 | B2 | 1/2017 | Economy et al. |

(Continued)

FOREIGN PATENT DOCUMENTS

WO WO2013111134 8/2013

*Primary Examiner* — Abdullah A Riyami
*Assistant Examiner* — Syed M Kaiser
(74) *Attorney, Agent, or Firm* — Crestron Electronics, Inc.

(57) ABSTRACT

Systems, methods, and modes for generating a custom dimming curve to more accurately controlling lighting loads, comprising at least one controller adapted: drive a lighting load by incrementally increasing light output levels from an initial minimum light output level to an initial maximum light output level; during each light output level increment, receive a light level reading from a light sensor; determine at which light output level increment the lighting load has turned on and set that determined light output level as a determined minimum light output level; determine at which light output level increment the lighting load has stopped increasing in intensity and set that determined light output level as a determined maximum light output level; and determine a custom dimming curve comprising the determined minimum light output level and determined maximum light output level in relation to a minimum dimming input level and a maximum dimming input level.

18 Claims, 5 Drawing Sheets

(56) References Cited

U.S. PATENT DOCUMENTS

| | | | | |
|---|---|---|---|---|
| 11,284,494 | B1 | 3/2022 | Slivka et al. | |
| 2014/0285093 | A1 | 9/2014 | Morimoto | |
| 2017/0339764 | A1 | 11/2017 | Nakamura | |
| 2017/0354021 | A1* | 12/2017 | Dimberg ................ | G05B 15/02 |
| 2018/0098403 | A1* | 4/2018 | Couch .................... | H05B 45/22 |
| 2018/0139818 | A1* | 5/2018 | Coombes ............... | H05B 45/22 |
| 2018/0317306 | A1* | 11/2018 | Harris .................... | H05B 47/18 |
| 2022/0022306 | A1* | 1/2022 | Ho ......................... | H05B 47/19 |
| 2022/0070982 | A1* | 3/2022 | Hussell .................. | H05B 47/11 |

* cited by examiner

SYSTEM AND METHOD FOR GENERATING A CUSTOM DIMMING CURVE

BACKGROUND OF THE INVENTION

Technical Field

Aspects of the embodiments relate to lighting load control devices, and more specifically to systems, methods, and modes for generating a custom dimming curve to more accurately controlling lighting loads.

Background Art

Dimmers are used for varying light levels or intensities of lighting loads by controlling the amount of power that is delivered to the loads. Phase control dimming is a commonly used method of dimming lighting loads. Taking a sine waveform voltage signal, phase control dimming involves varying the amount of time voltage is applied to the load during a given half cycle. To dim an incandescent light to 50%, for example, power to the load may be provided for 50% of the half cycle and turned off during the remaining 50% of the half cycle.

The brightness output, however, does not always change at the same rate as the amount of power inputted to the load. This is particularly true when dimming non-incandescent loads, such as light emitting diodes (LEDs), which do not behave as expected when they are dimmed. Some LED light sources do not turn on until a certain input voltage is reached—resulting in a turned off LED when operating the dimmer at low dimming input levels. Other LED light sources remain at the same brightness once a peak voltage is reached—thus, operating a dimmer to brighten the LED beyond a certain dimming input level results in no change. Inconsistencies in brightness output can also occur in the middle ranges of dimming input levels. At certain dimming input levels, changes in the LED's brightness may suddenly make a big jump, while in other dimming input levels changes in brightness may be unperceivable.

To introduce consistency in dimming, dimming curves are used to define the relationship of the dimming input level to the light output level or the amount of power that is delivered to the load to regulate brightness output. The light output level is set to increase by a set increment per percent of increase in the dimming input level as defined by the dimming curve. Dimming input level may be received by a dimmer from an external controller or from user interface, such as via a dimmer slider, and can be expressed in a percentage from 0% to 100% dimming input level. The dimmer selects the light output level and generates a power signal by applying the dimming input level to the dimming curve. Dimming curves are generally preselected at the factory, which presents an issue in the field for digital lighting loads, such as LEDs, that vary in lighting output between different bulb manufacturers, models, and even batch to batch. In more complex systems, dimming curves may be configured by the installed, such as by selecting the type of dimming curve or assigning minimum and maximum voltage outputs. But the process of generating custom dimming curves is complex, iterative, time consuming, and prone to subjective errors and inconsistencies between loads.

Accordingly, a need has arisen for systems, methods, and modes for generating a custom dimming curve to more accurately controlling lighting loads.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for generating a custom dimming curve to more accurately controlling lighting loads.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
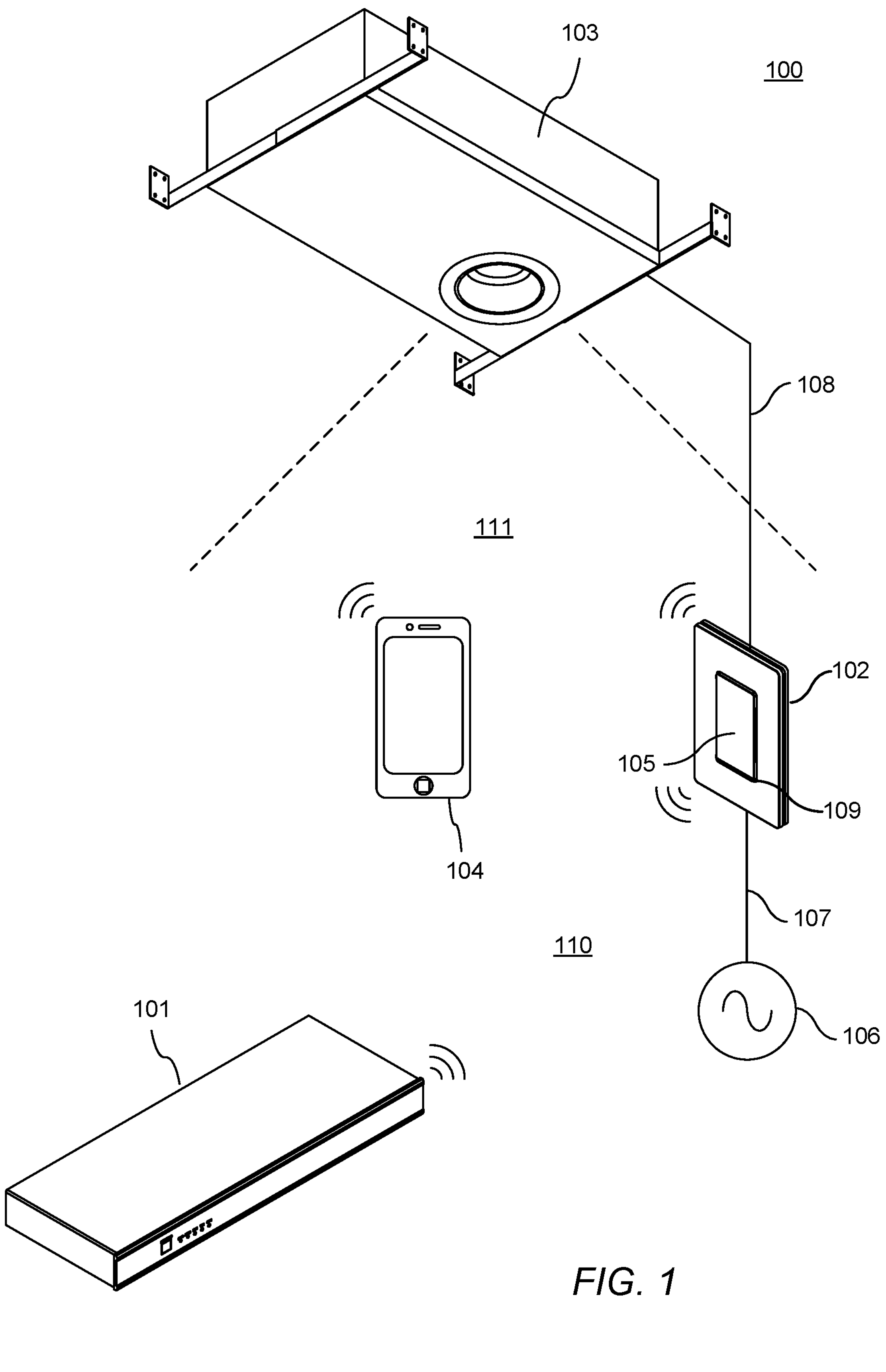

FIG. 1 illustrates a lighting control system according to an illustrative embodiment.

Figure 2:
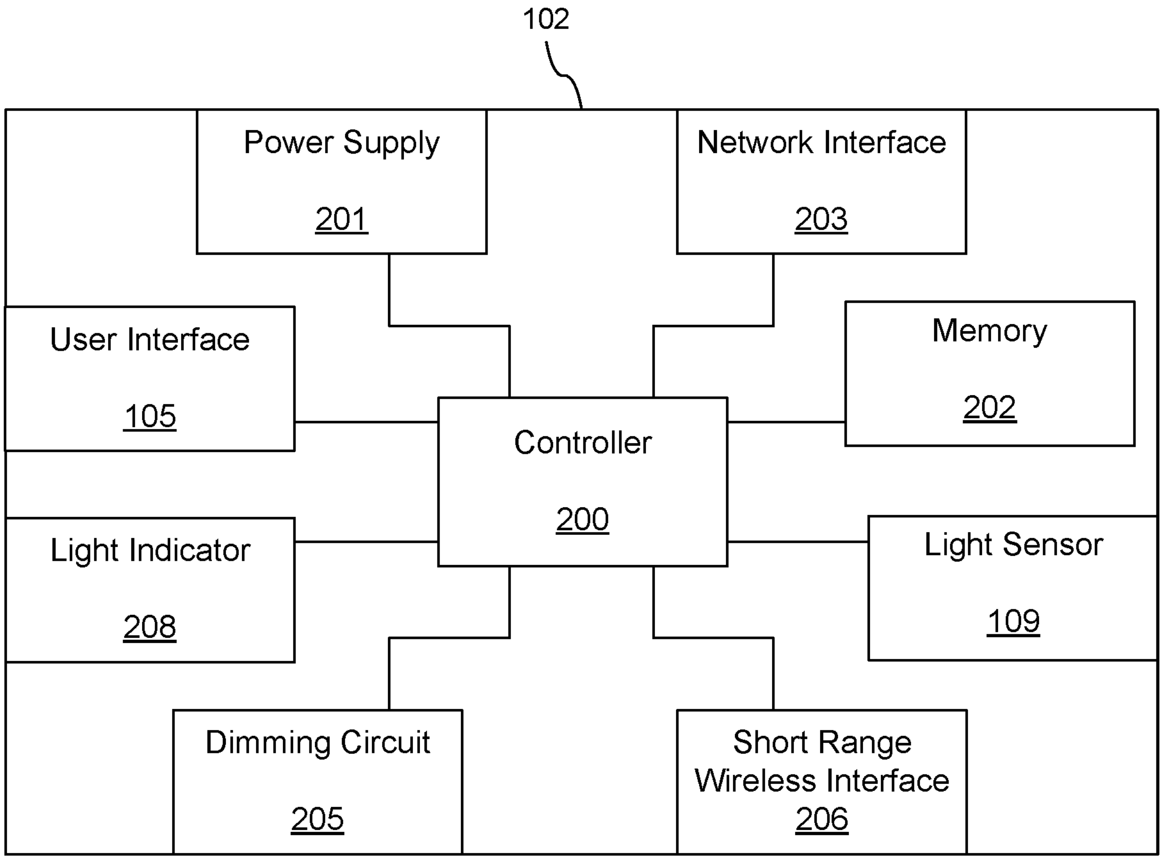

FIG. 2 illustrates a block diagram of a lighting control device of the lighting control system according to an illustrative embodiment.

Figure 3:
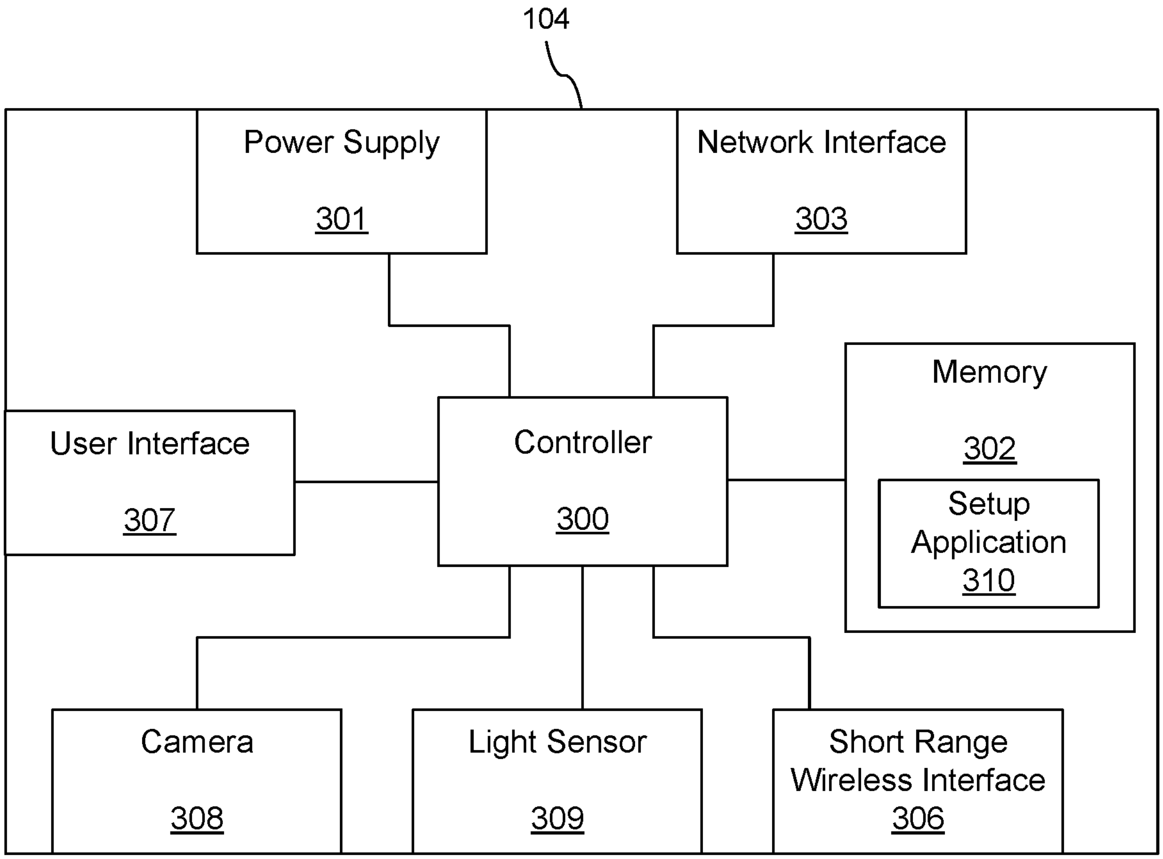

FIG. 3 illustrates a block diagram of a user communication device that may run a setup application in communication with the lighting control system according to an illustrative embodiment.

Figure 4:
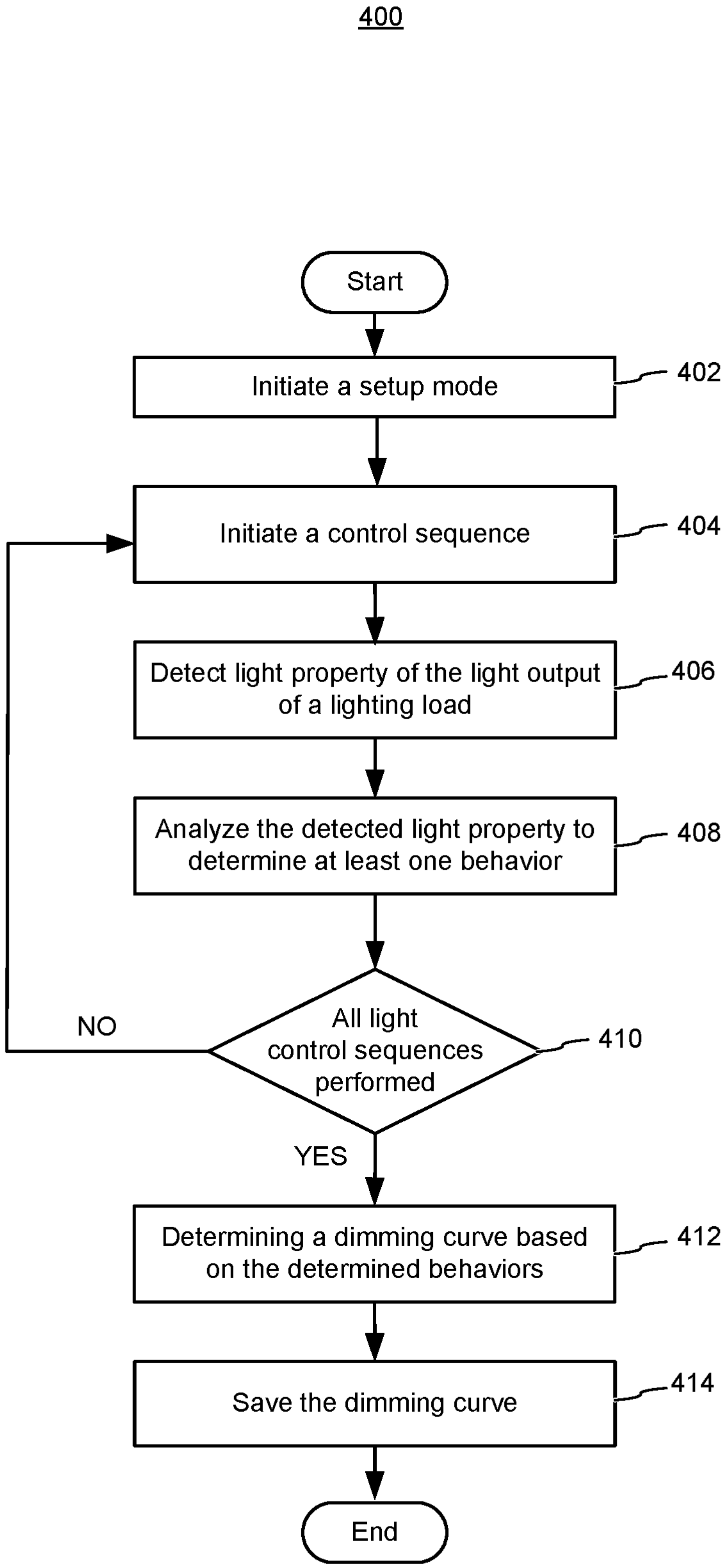

FIG. 4 illustrates a flowchart showing an exemplary method of configuring the lighting control device to determine and generate a custom dimming curve according to an illustrative embodiment.

Figure 5A:
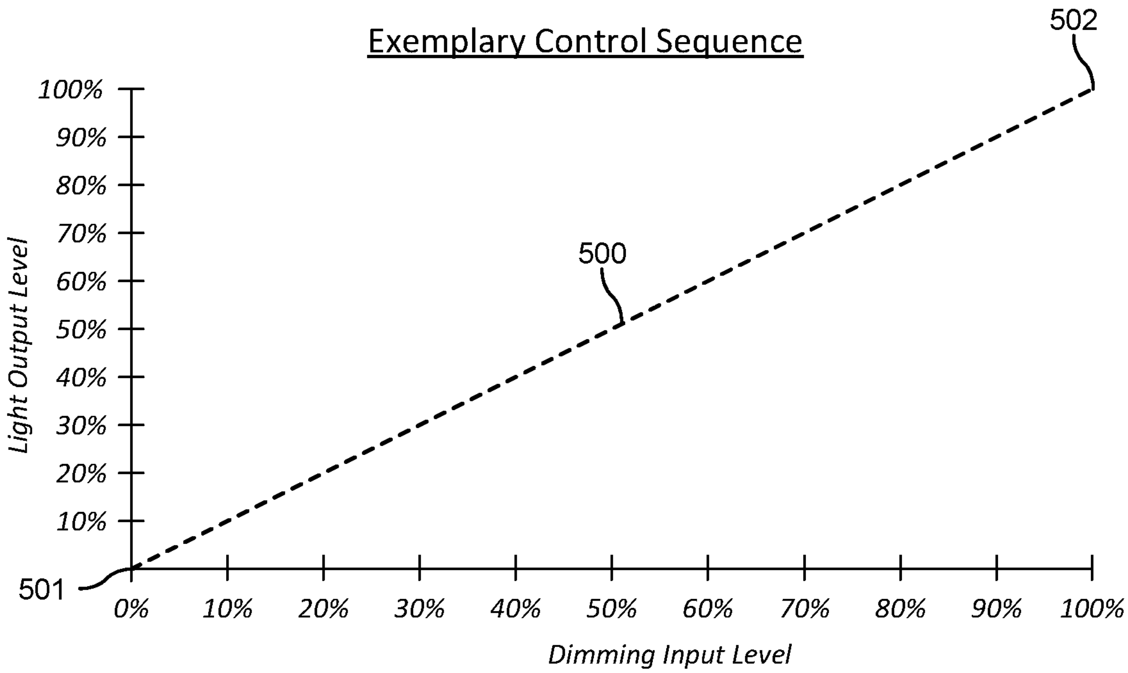

FIG. 5A illustrates a graph showing an exemplary control sequence according to an illustrative embodiment.

Figure 5B:
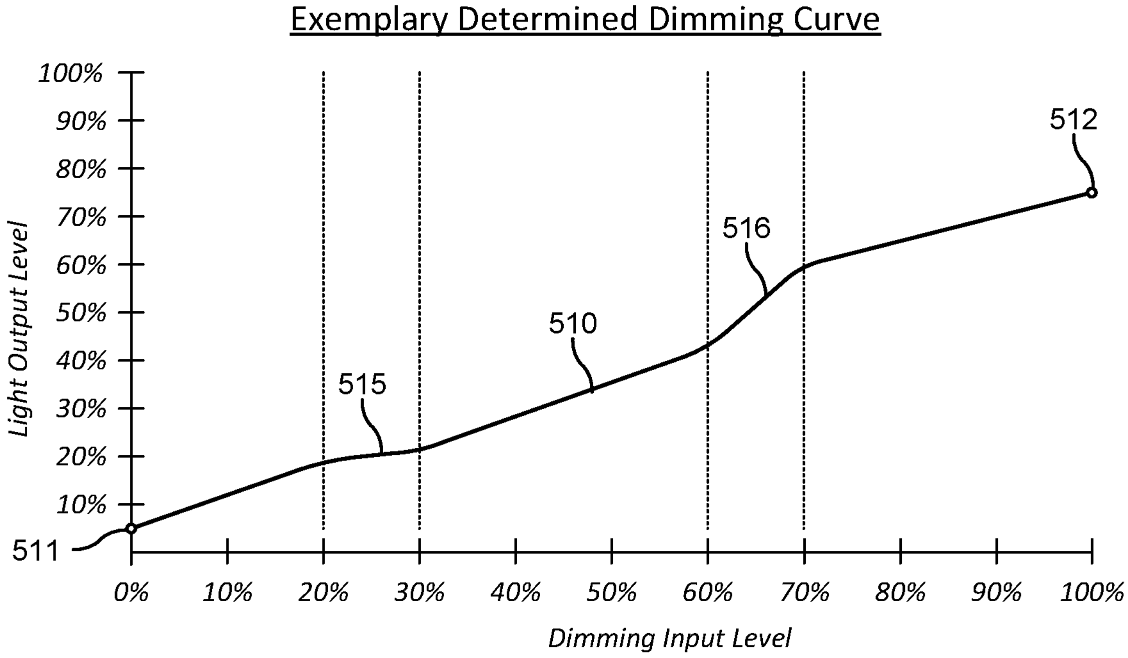

FIG. 5B illustrates a graph showing an exemplary determined dimming curve according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of device.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.

100 Lighting Control System
101 Control Processor
102 Lighting Control Device/Dimmer
103 Lighting Load
104 User Communication Device
105 User Interface
106 Power Source
107 Power Hot Signal
108 Dimmed Hot Output Signal
109 Light Sensor
110 Communication Network
111 Field of View
200 Controller
201 Power Supply
202 Memory
203 Network Interface
205 Dimming Circuit
206 Short Range Wireless Interface
208 Light Indicator
300 Controller
301 Power Supply
302 Memory
303 Network Interface
306 Short Range Wireless Interface
307 User Interface
308 Camera
309 Light Sensor
310 Setup Application
400 A Flowchart Showing an Exemplary Method of Configuring the Lighting Control Device to Determine and Generate a Custom Dimming Curve
402-414 Steps of Flowchart 400
500 Initial Dimming Curve
501 Initial Minimum Output Level
502 Initial Maximum Output Level
510 Determined Dimming Curve
511 Determined Minimum Light Output Level
512 Determined Maximum Light Output Level
515 Rapid Dimming Input Level Period
516 Sluggish Dimming Input Level Period List of Acronyms Used in the Specification in Alphabetical Order The following is a list of the acronyms used in the specification in alphabetical order.

AC Alternating Current
ASIC Application Specific Integrated Circuit
CCT Corrected Color Temperature
COM Communication Port
DC Direct Current
FET Field-Effect transistor
HSL Hue, Saturation, Lightness
HVAC Heating, Ventilation, Air Conditioning
HVC Hue, Saturation, Value
Hz Hertz
K Kelvin
IR Infrared
LED Light Emitting Diode
PoE Power-over-Ethernet
PWM Pulse Width Modulation
RAM Random-Access Memory
RF Radio Frequency
RGB Red-Green-Blue
RISC Reduced Instruction Set Computer
ROM Read-Only Memory
USB Universal Serial Bus
V Volt
WPAN Wireless Personal Area Network Mode(s) for Carrying Out the Invention For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of lighting load control devices, but are not limited thereto, except as may be set forth expressly in the appended claims. Particularly, the aspects of the embodiments are related to systems, methods, and modes for generating a custom dimming curve to more accurately controlling lighting loads.

FIG. 1 shows an exemplary lighting control system 100 according to one embodiment. The lighting control system 100 can comprise at least one lighting control device 102, such as a dimmer, electrically connected to at least one lighting load 103 to control such lighting load 103. The lighting control device 102 may control the lighting load 103 based on a saved scheme, scenes, scheduled event or sensor input, in response to commands received by the lighting control device 102 directly from a user actuating the control device buttons, and/or in response to commands received from an external control source, such as the control processor 101 of the lighting control system 100 or the user communication device 104. The lighting control device 102 may be connected in series with an alternating current (AC) power source 106, such as an AC mains power source, to receive electric AC power hot signal 107. The AC power source 106 may comprise 120 Volt (V) 60 Hertz (Hz) AC mains residential power supply. In other embodiments, the AC power source may supply power at a different voltage or frequency. For example, in another embodiment, the AC power source may supply 230V 50 Hz AC mains power supply. The lighting control device 102 may comprise a user interface 105, such as at least one button, which receives an input from a user indicating the desired dimming input level. For example, button 105 can be tapped or held up or down to dim the connected load 103. Although the user interface 105 may contain a plurality of buttons and alternative methods of actuating dimming, such as a slider, a turn knob, a touch screen, or the like. The control device 102 may further comprise a light sensor 109 configured for detecting and measuring ambient light as discussed below. According to another embodiment, the lighting control device 102 may be controlled remotely as well through a wired or wireless interface. The lighting control device 100 may use this user input to produce dimmed hot output signal 108 to a connected load 103 at a particular voltage level corresponding to the desired dimming input level as discussed below.

The load 103 may comprise a light source, such as a bulb installed in a light fixture or a luminaire with a built in light source. The light source can comprise any light source known in the art, such as LED, incandescent, fluorescent, halogen, xenon, HID, or the like. For example, the lighting load 103 may comprise a light fixture with a replaceable or integrated LED light source. The LED light source can comprise an LED module and an LED driver. The LED driver is electrically connected to and regulates the power supplied to the LED module. It can control the operation of the LED module in a variety of ways, including, but not limited to, turning the LED module on and off, dimming, incremental dimming, such as a high-medium-low operation, and adjusting the color of the light output, including color temperature adjustment or full color control, or the like. The LED module can comprise one or more LED emitters to generate white or multicolored light. For example, the LED module can comprise a single or a plurality of white LED emitters. According to another embodiment, the LED module can comprise a plurality of multicolored LEDs, such as a red-green-blue LEDs (RGB LEDs), comprising red, green, and blue LED emitters. The LED emitters can be independently controlled at different intensities using pulse width modulation (PWM) signal with a constant current LED driver with output values ranging between 0 and 65535 for a 16-bit channel—with 0 meaning fully off and 65535 meaning fully on. Varying these PWM values of each of the white LEDs or the RGB LEDs allows the LED light source to create a desired intensity and/or color temperature of white, or the desired intensity and/or color, respectively. The LED driver may be connected to the lighting control device 102 via wire leads to receive the dimmed hot output signal 108.

The control device 102 may be also configured to receive control commands from a control processor 101 via a communication network 110. The lighting control system 100 can also comprise other types of electronic devices to, for example, implement a building automation system, including keypads, sensors (e.g., occupancy, light, or temperature sensors), shade devices, lighting devices, heating, ventilation and air conditioning (HVAC) control devices or thermostats, audiovisual devices, security, appliances, door locks, among other known devices used in building automation systems. The control processor 101 operates to communicate with such control devices, including the lighting control device 102, to transmit or receive control commands as well as status information. For example, the lighting control system 100 can utilize the PRO4 4-Series control processor available from Crestron Electronics, Inc. to network, manage, and control the lighting control system 100. Although according to another embodiment, the lighting control system 100 of the present embodiments may be implemented using the lighting control device 102 without an implementation of a control processor 101.

Local communication network 110 of the lighting control system 100 may comprise a wired, a wireless, or a combined wired and wireless network. In one embodiment, a wireless local communication network 110 can comprise one or more wireless personal area networks (WPANs). Communication protocols govern the operation of the wireless network 110 by governing network formation, communication, interferences, and other operational characteristics. The wireless communication network 110 may be governed by a standard or proprietary communication protocols, such as infiNET EX®, ZigBee®, Wi-Fi®, Z-Wave®, or other protocols known in the art. According to another embodiment, a wired local communication network 110 may be governed by a standard or proprietary wired communication protocols, such as Cresnet®, DMX (e.g., DMX512), DALI®, 0-10V, RGBW, or other protocols known in the art. The wired communication network 110 can be implemented using bus wiring and one or more ports, such as a communication (COM) port, a universal serial bus (USB) port, a Cresnet® port, an Ethernet port (e.g., RJ-45), DMX port, DALI®, 0-10V low voltage dimming port, RGBW control ports, or the like.

Lighting control system 100 can further communicate with a remote server via a wide communication network to provide enhanced services and information to the lighting control system 100. For example, control processor 101 can communicate with server to report data, obtain various data collected by the remote server, or to transmit or receive control commands. Lighting control system 100 can also communicate with user devices, such as a user communication device 104, via a wide communication network (e.g., via the Internet), the local wired or wireless communication network 110, via another local wired or wireless communication network (e.g., via Wi-Fi), via a short range radio link such as Bluetooth or NFC, via a wired connection such as via a USB port, or the like, or any combinations thereof. The user communication device 104 may communicate to the lighting control system 100 by communicating with the control processor 101 and/or directly to any one of the control devices, including directly to the lighting control device 102. User communication device 104 may be used to configure the lighting control device 102, by for example, generating a custom dimming curve to be used by the lighting control device 102 as discussed herein.

Referring now to FIG. 2, there is shown a block diagram of a lighting control device 102 according to an illustrative embodiment. The lighting control device 102 comprises a power supply 201 for providing power to the various electrical components of the control device 102. As indicated above, the control device 102 may be powered by an AC power source and the power supply 201 may convert the incoming AC power signal to a direct current (DC) power signal. Such control device 102 may comprise leads or terminals suitable for making line voltage connections. In yet another embodiment, the control device 102 may be powered using Power-over-Ethernet (PoE) or via a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable. However, other types of connections or ports may be utilized.

The control device 102 may further include a controller 200 that may comprise one or more microprocessors, "general purpose" microprocessors, a combination of general and special purpose microprocessors, application specific integrated circuits (ASICs), reduced instruction set computer (RISC) processors, video processors, related chip sets, or the like, or any combinations thereof. The controller 200 can provide processing capability to execute an operating system, run various applications, and/or provide processing for one or more of the techniques and functions described herein. The control device 102 can further include a memory 202 communicably coupled to the controller 200 for storing data and executable code. Memory 202 can represent volatile memory such as random-access memory (RAM), but can also include nonvolatile memory, such as read-only memory (ROM) or Flash memory. In buffering or caching data related to operations of the controller 200, memory 202 can store data associated with applications running on the controller 200.

Control device 102 can further comprise one or more network interfaces 203, such as a wired or a wireless network interface, configured for bidirectional wireless communication with various devices in the lighting control system 100 via communication network 110 as discussed above. In various embodiments, a wireless interface can comprise a radio frequency (RF) transceiver, an infrared (IR) transceiver, or other communication technologies known to those skilled in the art. A wired interface can represent, for example, a COM port, a USB port, a Cresnet® port, an Ethernet port, a DMX port, a DALI® port, a 0-10V low voltage dimming port, an RGBW control port, or the like. In various aspects of the embodiments, control device 102 can both receive the electric power signal and output control commands through the PoE interface.

The control device 102 may further comprise a user interface 105, such as at least one button or the like, for receiving user input. Such input may include a command to turn the load on or off, increase or decrease light output levels of the load, recall a preset setting, configure the control device, or the like. The control device 102 may also comprise at least one light indicator 208, such as a multi-colored LED, configured for visually indicating the status of the control device 102 to the user. For example, if a button 105 is pressed, the light indicator 208 may briefly light green. The light indicator 208 may also indicate whether the control device 103 is trying to join a network, when it is configured, or the like. Additional status light indicators may also be provided, for example, to identify dimming input levels.

The control device 102 may further comprise a dimming circuit 205 configured for providing a dimmed voltage output signal 108 to the connected lighting load 103. Dimming circuit 205 may comprise a solid-state dimmer for dimming different types of lighting loads, including incandescent, fluorescent, LED, or the like. For example, the dimming circuit 205 may comprise dimming transistors (e.g., field-effect transistors (FETs)), current sensor, an isolator, or the like.

The control device 102 may further comprise a light sensor 109 configured for detecting and measuring ambient light. According to an embodiment, light sensor 109 can comprise at least one photosensor having an internal photocell with 0-65535 lux (0-6089 foot-candles) light sensing output to measure light intensity from natural daylight and ambient light sources. According to another embodiment, light sensor 109 can in addition or alternatively comprise a multichannel spectral sensor, an RGB sensor, an XYZ sensor, or the like, capable of detecting color of visible light regardless of luminance. Light sensor 109 may be used to control the intensity of the lighting load 103 that is being controlled by the control device 102. A light sensor dimming curve may be used to adjust the light intensity or the perceived brightness of lighting load 103 based on measured ambient light levels by the light sensor 109.

The control device 102 may further comprise a short range wireless interface 206, such as a Bluetooth module or an NFC module, configured for allowing connection with a user communication device 104 (FIG. 1), such as a mobile device, a smartphone, a tablet, or the like, as is further discussed below. Although according to an embodiment, other devices of the lighting control system 100, such as processor 101, may contain a short range communication module for communication with the user communication device 104.

Referring to FIG. 3, the user communication device 104 may comprise a controller 300, memory 302, power supply 301, network interface 303, short range wireless interface 306, a user interface 307, camera 308, and/or a light sensor 309. The controller 300 and memory 302 may comprise similar configuration as controller 200 and memory 202 discussed above. Memory 302 may store a setup application 310 that is run by the controller 300 to execute the processes discussed herein to determine and generate a custom dimming curve as discussed below. Power supply 301 may comprise a rechargeable battery. Network interface 303 can be configured to communicate with the control processor 101 via a communication network. For example, the user device 104 can communicate to the control processor 101 wirelessly via the local communication network 110, via a cellular communication network, via another wireless network set up in the building or home such as a Wi-Fi network, or the like, or via any combinations thereof. The short range wireless interface 306 may comprise similar configuration to short range wireless interface 203 such that it can communicate with the lighting control device 102. The user interface 307 may comprise a display screen, touch screen, buttons, keyboard, mouse, or the like, or any combinations thereof. Camera 308 may comprise a digital camera capable of recording images and/or video as is known in the art. The light sensor 309 may comprise an ambient light sensor adapted to detect ambient light, which can be an ambient light sensor that is part of the communication device's camera assembly or a separate ambient light sensor.

After installing the various electronic devices of the lighting control system 100 in a home or a building, the lighting control device 102 may be configured to determine and generate a custom dimming curve. According to one embodiment, the custom dimming curve can be determined using the setup application 310 running on the user communication device 104 and the user communication device's camera 308 and/or light sensor 309. According to another embodiment, a similar setup application 310 can be running on the control processor 101 or a remote server and accessed via a user interface connected to the control processor 101, or accessed via the user communication device 104 through a web portal. According to yet another embodiment, the custom dimming curve can be determined by the controller 200 of the control device 102 and its light sensor 109. For the purposes of the below description, as an example, a user is described using a setup application 320 running on the user communication device 104, such as a mobile device.

FIG. 4 illustrates a flowchart 400 showing an exemplary method of configuring the lighting control device 102 to determine and generate a custom dimming curve according to one embodiment. During the configuration process, the user communication device 104 may communicate with the lighting control device 102 directly, such as via their respective short range wireless interfaces 206 and 306 (e.g., via Bluetooth), via their network interfaces 203 and 303, via a wired connection, or indirectly through, for example, a control processor 101 via the local communication network 110. In step 402, the setup mode is initiated. According to an embodiment, the setup up mode may be initiated by a user accessing the setup application 310 on the user communication device 104 and triggering the set up mode by, for example, pressing a selection on the user interface 307 of the user communication device 104. The application 310 may also transmit instructions to the user interface 307 to direct the camera 308 (and/or light sensor 309) of the user communication device 104 in the field of view 111 of the lighting load 103 (FIG. 1). For example, the application 310 may instruct the user to approach the lighting load 103 and point the camera 308 towards the lighting load 103. The setup application 310 can also instruct the user to stand at a desired distance away from the lighting load 103, direct the camera 308 at a certain angle with respect to the lighting load 103, and specify the amount of time the camera 308 needs to be pointed at the lighting load 103, or the like, or any combinations thereof. The setup application 310 may further instruct the user to turn off all other loads in proximity for more accurate readings. According to another embodiment, the setup application 310 may instruct the lighting control device 102 to turn the lighting load 103 fully on so that the camera 308 of the user communication device 104 can adjust and lock its exposure so it is not over exposed.

In step 404, the user communication device 104 may initiate a control sequence by transmitting a predetermined control sequence to a lighting control device 102, either directly or through the control processor 101. The control device 102 may then enter into a setup mode and vary the power applied to the lighting load 103 according to the received control sequence. In step 406, as power is applied and varied to the lighting load 103, the camera 308 of the user communication device 104 may detect at least one light property of the light outputted by the lighting load 103 and communicate the detected light property to the setup application 310. Detected light property can comprise, for example, a light intensity level, light color, changes in light output, or the like, or any combinations thereof. According to an embodiment, the setup application 310 can analyze the video recorded by the camera 308 in real time or after the video is done recording. According to another embodiment, the setup application 310 can receive light property parameters generated by the user communication device 104. According to another embodiment, light properties may be detected using the light sensor 309, via an external cameras, or via a light sensor connected to or otherwise in communication with the user communication device 104. In step 408, the setup application may analyze the detected light property to determine at least one behavior of the lighting load 103. In step 410, the set up application 310 determines whether all control sequences were performed, and if not the set up application 310 can return to step 404 to perform additional control sequences to determine additional behaviors. According to various embodiments, the set up application 310 can output a plurality of control sequences to detect one or more light properties and determine one or more behaviors, or the set up application 310 can output a single control sequence from which it can detect one or more light properties and determine one or more behaviors.

After all control sequences are performed, in step 412 the setup application 310 determines a dimming curve based on the determined behaviors. The dimming curve can comprise a relationship between the dimming input level and the light output level. The relationship can be expressed via one or more mathematical functions, via a look up table, or the like, or any combinations thereof. The dimming input level can be expressed as a percentage from 0% to 100%. The light output level can be expressed in a percentage from 0% to 100%, or by some other factors, such as output voltage levels. The generated dimming curve can adjust the minimum and maximum light output levels based on detected light properties as further discussed below. In step 414, the setup application 310 can transmit the determined dimming curve to the lighting control device 102 and the lighting control device 102 may save the dimming curve in its memory 202.

According to another embodiment, the custom dimming curve can be determined by the controller 200 of the control device 102 and its light sensor 109. In such implementation, the setup mode in step 402 can be initiated, for example, using one or more buttons 105 of the control device. The controller 200 of the control device 102 may then initiate a control sequence in step 404. In step 406, the controller 200 can receive light levels detected by the light sensor 109 and in step 408 analyze the detected light property to determine at least one behavior of the lighting load 103. After determining that all control sequences are executed in step 410, the controller 200 may determine a dimming curve based on the determined behaviors in step 412, and save the dimming curve in its memory 202 in step 414.

The controller 200 of the control device 102 can utilize the dimming curve to determine the amount of power to deliver to the lighting load 103 in response to receiving a dimming input level. According to various embodiments, the dimming input level may be received from a user through the user interface 105 of the control device 102, from the light sensor 109 of the control device 102 based on light level readings in a room, from a control processors 101 which for example may operate the control device 102 via a scheduling scheme, from an external control point such as the user communication device 104, or the like. The control device or dimmer 102 may correlate the received dimming input level through the determined dimming curve to determine a corresponding light output level and generate the dimmed hot output signal 108 to the lighting load 103 based on the determined light output level. The generated dimming curve can also be transmitted to other lighting control devices 102 in an installation that control the same types of lighting loads 103 to produce consistent dimming throughout an installation.

The setup application 310 or controller 200 may perform a single or a plurality of control sequences to determine one or more behaviors of the lighting load 103. A control sequence can comprise incrementally dimming up and/or dimming down the lighting load 103. FIG. 5A illustrates an exemplary control sequence comprising an initial linear dimming curve 500 for gradually dimming up or dimming down a lighting load 103 in increments from an initial minimum output level 501, such as 0%, to an initial maximum output level 502, such as 100%. According to an embodiment, initial dimming curve 500 may comprise a linear dimming curve with a slope equaling to one where the light output levels linearly change from 0% to 100% at the same rate in relation to the dimming input levels of 0% to 100% as illustrated in FIG. 5A. Instead of using percentages, the light output level can comprise voltage levels. However, the control sequence can comprising an initial dimming curve 500 with a different slope or a different type of dimming curve, such as a logarithmic dimming curve, or comprise other types of predetermined control commands. According to an embodiment, the exemplary control sequence in FIG. 5A may direct the control device 102 to turn the lighting load 103 off between each light output level increment, for example at every 1% dimming input level, then turn it back on at the next light output level increment, although the control sequence may continuously dim up or dim down the lighting load 103. While the lighting load 103 is being incrementally dimmed up or dimmed down, the setup application 310 or controller 200 can observe the light outputted form the lighting load 103 using camera 308, light sensor 309, or light sensor 109, depending on implementation, to detect at least one light property and determine at least one behavior. Based on the determined behaviors, the setup application 310 or controller 200 can determine a dimming curve, such as an exemplary determined dimming curve 510 illustrated in FIG. 5B.

According to one embodiment, the setup application 310 or controller 200 can determine the minimum light output level for the dimming curve. Some LED light sources require a minimum output voltage from the dimmer before the LED light source even turns on. When using conventional dimmers, such LED light sources would not turn on when the dimmer receives low dimming input signal and delay in turning on until the minimum output voltage is reached. To determine the minimum light output level for the dimming curve, the setup application 310 or controller 200 may utilize the exemplary initial dimming curve 500 to direct the control device 102 to gradually increment the light output levels from the initial minimum light output level 501 to the initial maximum light output level 502. During each light output level increment, the setup application 310 or controller 200 may receive detected light properties of the lighting load 103 from the camera 308 or light sensor 109, respectively, and analyze the received light properties to determine at which light output level increment the lighting load 103 had turned on. If the light had turned on, the setup application 310 or controller 200 can further analyze the received light properties to determine whether flickering occurred and continue to increment the light output levels until flickering disappears. The setup application 310 or controller 200 can record the light output level at which the light output had turned on without flickering as the minimum light output level for the dimming curve. For example, referring to FIG. 5B, if the setup application 310 or controller 200 determines that the light had turned on without flickering at 5% light output level, the setup application 310 or controller 200 will set the 5% light output level as the determined minimum light output level 511 on the dimming curve 510.

Similarly, the setup application 310 or controller 200 can determine the maximum light output level for the dimming curve. Some light sources, such as LED light sources, do not get any brighter after they reach some peak voltage. A conventional dimmer does not determine this peak voltage and will continue to increase its output voltage beyond this peak voltage. This results in dead travel in the user interface of the dimmer at the higher dimming input range and bad user experience in which the load does not changes in brightness. This can be so egregious as to occur at about 50% dimming input level, resulting, for example, in the light output to have no changes in brightness when a dimmer slider travels to higher dimming input levels beyond its midpoint. To determine the maximum light output level for the dimming curve, the setup application 310 or controller 200 may utilize the exemplary initial dimming curve 500 to direct the control device 102 to gradually increment the light output levels from the initial minimum light output level 501 to the initial maximum light output level 502. According to an embodiment, the maximum light output level may be determined at the same time and using the same control sequence as the minimum light output level is determined. During each light output level increment, the setup application 310 or controller 200 may receive detected light properties of the lighting load 103 from the camera 308 or light sensor 109, respectively, and analyze the received light properties to determine at which light output level increment the detected light output, such as light intensity, of the lighting load 103 stopped increasing in intensity or brightness. The setup application 310 or controller 200 can record the light output level at which the detected light output, or light intensity, stopped increasing as the maximum output voltage for the dimming curve. For example, referring to FIG. 5B, if the setup application 310 or controller 200 determines that the detected light intensity is no longer effected after the 75% light output level, the setup application or controller will set the 75% light output level as the determined maximum light output level 512 on the dimming curve 510. According to another embodiment, the control sequence can instead comprise gradually decrementing the light output level from the initial maximum voltage level 502 to the initial minimum voltage level 501 to determine the light output level at which the detected light output, such as light intensity, of the light load 103 started to change and decrease and record that determined light output level as a maximum light output level 512 for the dimming curve 510.

Using the determined minimum light output level 511 (e.g., at 5%) and the determined maximum light output level 512 (e.g., at 75%), the setup application 310 or controller 200 can determine a dimming curve. For example, using the minimum light output level 511 and the maximum light output level 512 the setup application 310 or controller 200 can calculate a dimming slope and generate a linear dimming curve with dimming input levels that ranges between 0% and 100% and light output levels that ranges between 5% and 75%. The light output levels in between 5% and 75% can be substantially equally distributed between the 0% and 100% dimming input levels so that the perceived light output is increased in a linear relationship. This will maximize the dimming resolution and ensure that the light source is perceivably gets brighter or dimmer throughout the entire dimming input level range. As an example, the dimming input level of 0% can correspond to 5% light output level, dimming input level of 50% can correspond to 36.5% light output level, and 100% dimming input level can correspond to a 75% light output level. According to another embodiment, the determined dimming curve can comprise other curves known in the art, such as a logarithmic curve comprising smaller light output level increase at the low end of the dimming curve and large light output level increases at the high end of the dimming curve, allowing users to fine tune light at the low end where the human eye is more sensitive to light changes.

According to a further embodiment, the setup application 310 or controller 200 can also detect light behaviors occurring in the mid dimming input level ranges anywhere between 0% and 100%. According to one embodiment, the setup application 310 or controller 200 can detect such mid-range behaviors at the same time and using the same control sequence (e.g., using dimming curve 500) as when determining the minimum light output level 511 and the maximum light output level 512. According to another embodiment, the setup application 310 or controller 200 can generate a control sequence comprising a dimming curve determined using the determined minimum and maximum light output levels 511 and 512 to observe the behavior of the light outputted by the light source 103 between the determined minimum and maximum light output levels 511 and 512 for better resolution. For example, the setup application 310 or controller 200 may incrementally increase or decrease the light output level between the determined minimum and maximum light output levels 511 and 512 to detect inconsistencies in the outputted light behaviors therebetween. For example, the setup application 310 or controller 200 may measure the intensity of light at each light output level increment and detect dimming input level ranges with rapid increases in intensity levels where the light output suddenly gets really bright. Similarly, the setup application 310 or controller 200 can detect dimming input level ranges with sluggish increases in intensity levels where the light source 103 stops increasing in brightness at the same rate compared to previous or succeeding light dimming input level ranges. The setup application 310 or controller 200 may use this data to adjust the dimming curve to eliminate rapid or sluggish increases in light output to force the light output to behave more consistently throughout the entire dimming cycle. During periods of rapid increases in light intensity, for example during period 515 shown in FIG. 5B, the setup application 310 or controller 200 can slow down the increase in intensity levels by distributing less light output levels during the detected dimming input level range 515 with rapid increases in intensity levels. Similarly, during sluggish increases, for example during period 516 shown in FIG. 5B, the setup application 310 or controller 200 may adjust the dimming curve by speeding up the increase in intensity levels by distributing more light output levels during the detected dimming input level range 516 with sluggish increases in intensity levels. To slow down or speed up increase in intensity levels, the setup application 310 or controller 200 can calculate and adjust the respective slopes of the dimming curve 510 for the detected dimming input level ranges 515 and/or 516 during which light intensities are rapid and/or sluggish, respectively.

According to a further embodiment, the setup application 310 or controller 200 can iteratively perform the above control sequences over a plurality of cycles to verify the determined behaviors. For example, the setup application 310 or controller 200 can incrementally increase or decrease dimming input levels a plurality of times and determine and average the resulting determined minimum and the maximum light output levels.

According to yet another embodiment, the setup application 310 or controller 200 may determine and generate a first dimming curve during dimming up of the lighting load 103 and determine and generate a different second dimming curve during dimming down of the lighting load 103 as the light source can behave differently when voltage is gradually added compared to when voltage is removed. For the dimming up dimming curve, the setup application 310 or controller 200 can observe the light output while gradually incrementing the light output level to determine the minimum and maximum light output level for the dimming up dimming curve. For the dimming down dimming curve, the setup application 310 or controller 200 can observe the light output while gradually decrementing the light output level to determine the minimum and maximum light output level for the dimming down dimming curve.

According to an alternative embodiment, the processes discussed herein may be utilized to calibrate the color of an LED lighting load in addition to determining a dimming curve. For Red-Green-Blue (RGB) LEDs capable of producing various colors or for LED load capable of producing various color temperatures, the setup application 310 or controller 200 may utilize camera 308 of the user communication device 104 or light sensor 109 of the control device 102, respectively, to detect the color of the light output and calibrate the white point such that LED lighting load stays at a consistent color temperature while dimming a lighting load up and down. For example, the lighting control device 102 may be instructed to illuminate the LED lighting load at a specific color temperature. The lighting control device 102 may then increase or decrease brightness of each emitter of the LED lighting load to dim up or dim down the LED lighting load. Meanwhile, the setup application 310 or controller 200 may observes the light output via the camera 308 or light sensor 109, respectively, and iteratively adjust the RGB emitter values up or down to try to maintain substantially the same white point or color temperature as the load is dimmed up or down. The setup application 310 or controller 200 may map the determined RGB emitter values and determine a dimming curve for the LED with the determined RGB emitter values to keep the LED lighting load at the substantially the same white point or color temperature as the load is dimmed up or down. The setup application 310 or controller 200 may repeat this process to generate a dimming curve for different color temperatures, such as a warm white dimming curve at 3000 Kelvin (K), a cool white dimming curve at 5000K, and a daylight dimming curve at 6500K. Accordingly, an LED lighting load that needs to be controller using RGB or RGBw emitter input, can be controlled using HSV (hue, saturation, value), HSL (hue, saturation, lightness), or CCT (corrected color temperature) control schemes. Using the same camera to calibrate the white points of other LED sources will allow to produce consistent color temperatures in an installation.

Industrial Applicability

The disclosed embodiments provide a system, software, and a method for generating a custom dimming curve to more accurately controlling lighting loads. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

Moreover, the process for generating a custom dimming curve to more accurately controlling lighting loads is not meant to limit the aspects of the embodiments, or to suggest that the aspects of the embodiments should be implemented following the process. The purpose of the process is to facilitate the understanding of one or more aspects of the embodiments and to provide the reader with one or many possible implementations of the process discussed herein. The steps performed during the process are not intended to completely describe the process but only to illustrate some of the aspects discussed above. It should be understood by one of ordinary skill in the art that the steps may be performed in a different order, additional steps may be added, and that some steps may be eliminated or substituted.

What is claimed is:

1. A wall mounted control device adapted to determine a custom dimming curve for driving an associated lighting load comprising:
- a memory that stores an initial dimming curve comprising an initial minimum light output level and an initial maximum light output level in relation to a minimum dimming input level and a maximum dimming input level; and
- at least one controller adapted to:
  - drive the lighting load by incrementally increasing light output levels from the initial minimum light output level to the initial maximum light output level;
  - during each light output level increment, receive a light level reading from a light sensor;
  - determine at which light output level increment the lighting load has turned on and set that determined light output level as a determined minimum light output level;
  - determine at which light output level increment the lighting load has stopped increasing in intensity and set that determined light output level as a determined maximum light output level; and
  - determine a custom dimming curve comprising the determined minimum light output level and determined maximum light output level in relation to the minimum dimming input level and the maximum dimming input level, wherein light output levels between the determined minimum light output level and the determined maximum light output level are substantially equally distributed between the minimum dimming input level and the maximum dimming input level.

2. The control device of claim 1, wherein the initial minimum light output level and the initial maximum light output level comprise percentage values of 0% to 100%, respectively.

3. The control device of claim 1, wherein the initial minimum light output level and the initial maximum light output level comprise voltage level values.

4. The control device of claim 1, wherein after each light output level increment, the at least one controller turns the lighting load off.

5. The control device of claim 1, wherein after detecting at which light output level increment the lighting load has turned on, the at least one controller continues to incrementally increase the light output levels to determine whether flickering occurred; if the at least one controller does not detect flickering, then the at least one controller sets the determined light output level at which the lighting load has turned on as the determined minimum light output level; if the at least one controller detects flickering, then the at least one controller determines at which light output level increment flickering is no longer detected and sets the determined light output level at which flickering is no longer detected as the determined minimum light output level.

6. The control device of claim 1, wherein one of the initial dimming curve and the custom dimming curve comprises at least one selected from a lineal curve, a logarithmic curve, a mathematical function, a look up table, and any combinations thereof.

7. The control device of claim 1, wherein the at least one controller is further adapted to compare the received light readings to determine at which light output level increments the light sensor has detected substantial change in light level readings and adjust the slope of the custom dimming curve.

8. The control device of claim 1, wherein the at least one controller is further adapted to drive the lighting load by incrementally decreasing light output levels from the initial maximum light output level to the initial minimum light output level and determine a second custom dimming curve.

9. A wall mounted control device adapted to determine a custom dimming curve for driving an associated lighting load comprising:
- a memory that stores an initial dimming curve comprising an initial minimum light output level and an initial maximum light output level in relation to a minimum dimming input level and a maximum dimming input level; and
- at least one controller adapted to:
  - drive the lighting load by incrementally increasing light output levels from the initial minimum light output level to the initial maximum light output level;
  - during each light output level increment, receive a light level reading from a light sensor;
  - determine at which light output level increment the lighting load has turned on and set that determined light output level as a determined minimum light output level;

determine a first dimming curve comprising the determined minimum light output level in relation to the minimum dimming input level; and drive the lighting load by incrementally decreasing light output levels from the initial maximum light output level to the initial minimum light output level and determine a second custom dimming curve.

10. A wall mounted control device adapted to determine a custom dimming curve for driving an associated lighting load comprising:

a memory that stores an initial dimming curve comprising an initial minimum light output level and an initial maximum light output level in relation to a minimum dimming input level and a maximum dimming input level;

at least one controller adapted to:

drive the lighting load by incrementally increasing light output levels from the initial minimum light output level to the initial maximum light output level;

during each light output level increment, receive a light level reading from a light sensor;

determine at which light output level increment the lighting load has turned on;

continue to incrementally increase the light output levels to determine whether flickering occurred, and:

if the at least one controller does not detect flickering, then set the determined light output level at which the lighting load has turned on as the determined minimum light output level;

if the at least one controller detects flickering, then determine at which light output level increment flickering is no longer detected and set the determined light output level at which flickering is no longer detected as the determined minimum light output level; and determine a custom dimming curve comprising the determined minimum light output level in relation to the minimum dimming input level.

11. A system for determining a custom dimming curve for a lighting load comprising a wall mounted control device comprising a dimming circuit adapted to control an electrically connected lighting load;

a light sensor in proximity to the lighting load that detects light and outputs light level readings;

a memory that stores an initial dimming curve comprising an initial minimum light output level and an initial maximum light output level in relation to a minimum dimming input level and a maximum dimming input level; and at least one controller adapted to:

direct the dimming circuit to drive the lighting load by incrementally increasing light output levels from the initial minimum light output level to the initial maximum light output level;

during each light output level increment, receive a light level reading from the light sensor;

determine at which light output level increment the lighting load has turned on and set that determined light output level as a determined minimum light output level;

determine at which light output level increment the lighting load has stopped increasing in intensity and set that determined light output level as a determined maximum light output level; and determine a custom dimming curve comprising the determined minimum light output level and determined maximum light output level in relation to the minimum dimming input level and the maximum dimming input level, wherein the light output levels between the determined minimum light output level and the determined maximum light output level are substantially equally distributed between the minimum dimming input level and the maximum dimming input level.

12. The system of claim 1, wherein the control device comprises a first short range wireless interface; wherein the at least one controller comprises a user communication device having a second short range wireless interface adapted to communicate with the first short range wireless interface.

13. The system of claim 11, wherein the light sensor comprises a camera.

14. The system of claim 11, wherein after each light output level increment, the dimming circuit is directed to turn the lighting load off.

15. The system of claim 11, wherein after detecting at which light output level increment the lighting load has turned on, the at least one controller continues to direct the dimming circuit to incrementally increase the light output levels to determine whether flickering occurred; if the at least one controller does not detect flickering, then the at least one controller sets the determined light output level at which the lighting load has turned on as the determined minimum light output level; if the at least one controller detects flickering, then the at least one controller determines at which light output level increment flickering is no longer detected and sets the determined light output level at which flickering is no longer detected as the determined minimum light output level.

16. The system of claim 11, wherein one of the initial dimming curve and the custom dimming curve comprises at least one selected from a lineal curve, a logarithmic curve, a mathematical function, a look up table, and any combinations thereof.

17. The system of claim 11, wherein the at least one controller is further adapted to compare the received light readings to determine at which light output level increments the light sensor has detected substantial change in light level readings and adjust the slope of the custom dimming curve.

18. The system of claim 11, wherein the at least one controller is further adapted to direct the dimming circuit to drive the lighting load by incrementally decreasing light output levels from the initial maximum light output level to the initial minimum light output level and determine a second custom dimming curve.

* * * * *